United States Patent [19]
Pistiner

[11] 3,998,409
[45] Dec. 21, 1976

[54] MINIMIZATION OF SPACECRAFT ATTITUDE ERROR DUE TO WHEEL SPEED REVERSAL

[75] Inventor: Josef Siegfried Pistiner, Lafayette Hill, Pa.

[73] Assignee: RCA Corporation, New York, N.Y.

[22] Filed: Mar. 11, 1975

[21] Appl. No.: 557,318

[52] U.S. Cl. .......................... 244/165; 235/150.2; 244/3.21; 318/489; 318/610
[51] Int. Cl.[2] ......................................... B64G 1/20
[58] Field of Search .................. 74/5.5; 235/150.2; 244/3.21, 3.23, 77 R, 165; 318/580, 596, 610, 639, 489

[56] References Cited
UNITED STATES PATENTS

| | | | |
|---|---|---|---|
| 3,350,033 | 10/1967 | Goldberg | 244/165 |
| 3,424,401 | 1/1969 | Maurer | 244/165 |
| 3,493,194 | 2/1970 | Kurzhals | 244/165 |
| 3,591,108 | 7/1971 | Perkel et al. | 244/165 |
| 3,696,282 | 10/1972 | Hirokawa et al. | 318/610 X |

OTHER PUBLICATIONS

Cummings, J. A. et al., *Skewed Versus Orthogonal Reaction Wheels for Outer Planet Exploration*, AAS Conference, Seattle, Washington, 6–1971, AAS 71–157.

Primary Examiner—Stephen G. Kunin
Attorney, Agent, or Firm—Edward J. Norton; Joseph D. Lazar; Michael M. Rickin

[57] ABSTRACT

An attitude control system for a substantially zero momentum spacecraft is arranged to minimize the attitude errors during periods of reaction wheel speed reversals. Wheel speed is sensed by a suitable device such as a tachometer or Hall elements. Spacecraft three axis attitude is sensed by suitable sensors such as sun sensors, star sensors, gyroscopes or earth horizon sensors. A control network is provided to generate the wheel torque commands necessary to maintain proper three axis attitude. During periods of wheel speed reversal, the control network includes appropriate compensation terms and corrections to the wheel torque command.

22 Claims, 9 Drawing Figures

MINIMIZATION OF SPACECRAFT ATTITUDE ERROR DUE TO WHEEL SPEED REVERSAL

The invention herein described was made in the course of or under a contract or subcontract thereunder with the United States Air Force.

CROSS REFERENCE TO RELATED APPLICATIONS

Of interest is the following copending patent application which is assigned to the same assignee as the present application: Ser. No. 560,361, filed Mar. 20, 1975, entitled "Backup Wheel for a Three Axis Reaction Wheel Spacecraft," based on the invention of L. Muhlfelder and N. U. Huffmaster.

BACKGROUND OF THE INVENTION

1. Field of the Invention

This invention relates to attitude control for zero momentum spacecraft and more particularly to minimizing attitude errors during periods of reaction wheel speed reversals by the addition of compensation terms to the appropriate wheel torque command.

2. Description of the Prior Art

Precise pointing earth oriented satellites may use an orthogonal reaction wheel set for attitude control. Precise three-axis attitude control is achieved by means for control torques developed by the three reaction wheels in response to sensor-derived attitude error information. The three reaction wheels are usually mounted in the spacecraft in such a manner that their axes are parallel to an orthogonal set of body axes about which attitude control is to be maintained. For an earth-pointing spacecraft, one of the wheel axes is parallel to the spacecraft pitch axis which nominally rotates about the orbit normal at one revolution per orbit. The other two wheel axes are aligned with the spacecraft roll and yaw axes, respectively. In the absence of large external disturbance torques, such a spacecraft system is referred to as zero-momentum system because the reaction wheel momentum variations about zero would be minimal when the spacecraft products of inertia are small. The roll and yaw axis reaction wheels interchange their stored angular momenta on a quarter orbit basis. This means that each of the two wheels reverse its speed direction twice per orbit. Speed direction reversals introduce excessive attitude disturbances because of internal wheel static and coulomb friction and cogging torque. The wheel may come to a complete stop for extended periods of time if the available motor torque is insufficient to overcome the effect of the internal wheel friction and torque. Many systems have been proposed heretofore for avoiding the problems associated with zero wheel speed. Some prior art attitude control systems use at least two reaction wheels on each axis to prevent wheel speed reversals. In the absence of external disturbance and internal gyroscopic cross-coupling torques, each wheel rotates in the opposite direction to its respective twin, with both wheels running at the same preselected speed. Thus, in the unperturbed case, the net stored momentum for each pair of wheels is zero. In the presence of external disturbance and internal gyroscopic cross-coupling torques, one of the two wheels provides the necessary control torque by changing its wheel speed magnitude so that the net difference in wheel speed of each wheel pair represents the total angular momentum stored along the respective spacecraft axis. By proper selection of wheel speed magnitude and momentum unloading logic, wheel speed direction reversal can be avoided. Other prior art attitude control systems use combinations of control moment gyroscopes on each axis to obviate the need for wheel speed reversals. Each of the enumerated prior art techniques have basic disadvantages in that both multiple reaction wheels and control moment gyroscopes entail additional weight, power, cost, and size. In addition control moment gyroscopes require more complex control laws. Accordingly, a system for compensating for errors introduced by wheel speed reversals is needed to overcome the deficiencies of the presently known systems.

SUMMARY OF THE INVENTION

According to the present invention, a closed loop attitude control system for minimizing attitude errors during periods of wheel speed reversal in a substantially zero momentum spacecraft includes three axis attitude sensors with control logic responding to the attitude errors generated by the sensors to develop torque commands to cause the spacecraft's three mutually perpendicular wheels to develop control torque so as to correct the deviation of each axis. The angular velocity of each wheel is measured and compared to a predetermined velocity. If the predetermined velocity is greater than the velocity of a wheel, the torque command is modified to minimize the attitude error during periods of wheel speed reversal.

DESCRIPTION OF A PREFERRED EMBODIMENT

Before proceeding to the detailed description of the method and system of the embodiment of the present invention, a description of a three axis attitude control system for a substantially zero momentum spacecraft will be given.

Figure 1:
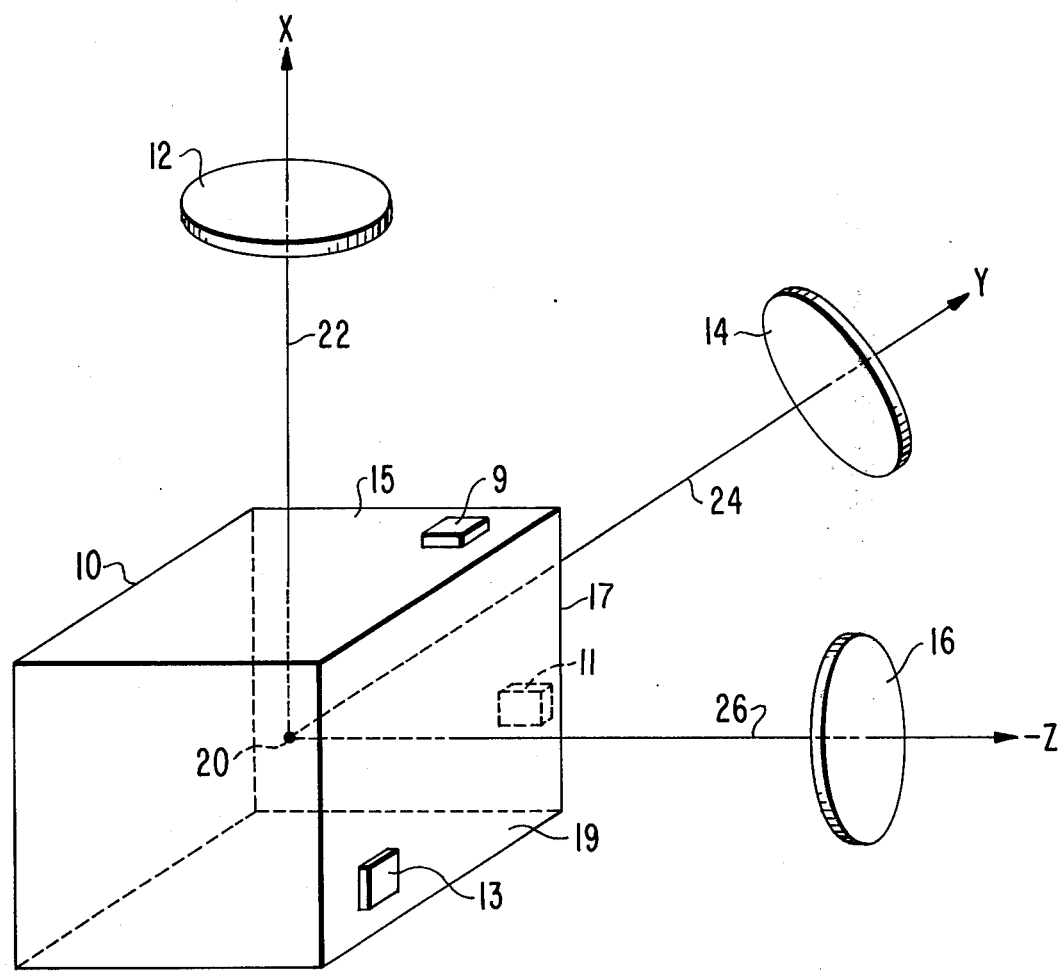
FIG. 1 is a schematic in perspective of a spacecraft showing the primary reaction wheel axes related to one embodiment of the invention.

Shown in FIG. 1, is a body 10 which may be a spacecraft pr satellite. Body 10 is shown in a rectangular configuration but any other shape may be utilized as well. For instance, the body 10 may also be oblate, cylindrical, or other form. The body 10 has a center of mass designated as 20. Emanating from the center of mass 20 are three mutually perpendicular axes 22, 24, 26, which are respectively designated as the X or yaw axis 22: Y or roll axis 24; and −Z or pitch axis 26. The axis system as defined and used herein according to the usual convention is right handed in the order X, Y, Z. These three axes 22, 24, 26, comprise the spacecraft's 10 principal axes. Mounted on the spacecraft are three reaction wheels for yaw 12, roll 14, and pitch 16 in such a manner that their axes are parallel to the orthogonal set of body axes 22, 24, 26. The wheels 12, 14, 16 are rotated by bi-directional motor drives (not shown)

to provide the torques necessary to maintain the attitude of spacecraft 10.

Three axis attitude of spacecraft 10 is determined as is well known in the art by suitable sensors 9, 11, 13. Sensor 9 is mounted in the Y–Z plane 15, sensor 11 is mounted in the X–Z plane 17, and sensor 13 is mounted in the X–Y plane 19.

Spacecraft's 10 attitude may be disturbed by internal and external disturbance torques acting on each axis 22, 24, 26. To maintain perfect attitude, the torques developed by wheels 12, 14, 16 must completely balance such disturbance torques. External disturbance torques may occur as a result of the gravity gradient, solar radiation, or interaction between the earth's magnetic field and magnetic dipoles located on spacecraft 10. With respect to the X and Y axes 22, 24, the internal disturbance torque on each axis is the torque due to gyroscopic cross-coupling between the X and Y wheels. Three are no internal Z-axis torques due to gyroscopic cross-coupling as will be explained.

For an earth pointing spacecraft, the X and Y reaction wheels 12, 14 interchange their stored angular momenta approximately on a quarter orbit basis. This interchange of angular momenta is due to gyroscopic cross-coupling between the wheels 12, 14. As a result of this momenta interchange, errors occur in the attitude of spacecraft 10. To compensate for these attitude errors, wheels 12, 14 must undergo two speed reversals per orbit as will be explained. Z reaction wheel 16 normally does not undergo any speed reversals.

Figure 2:
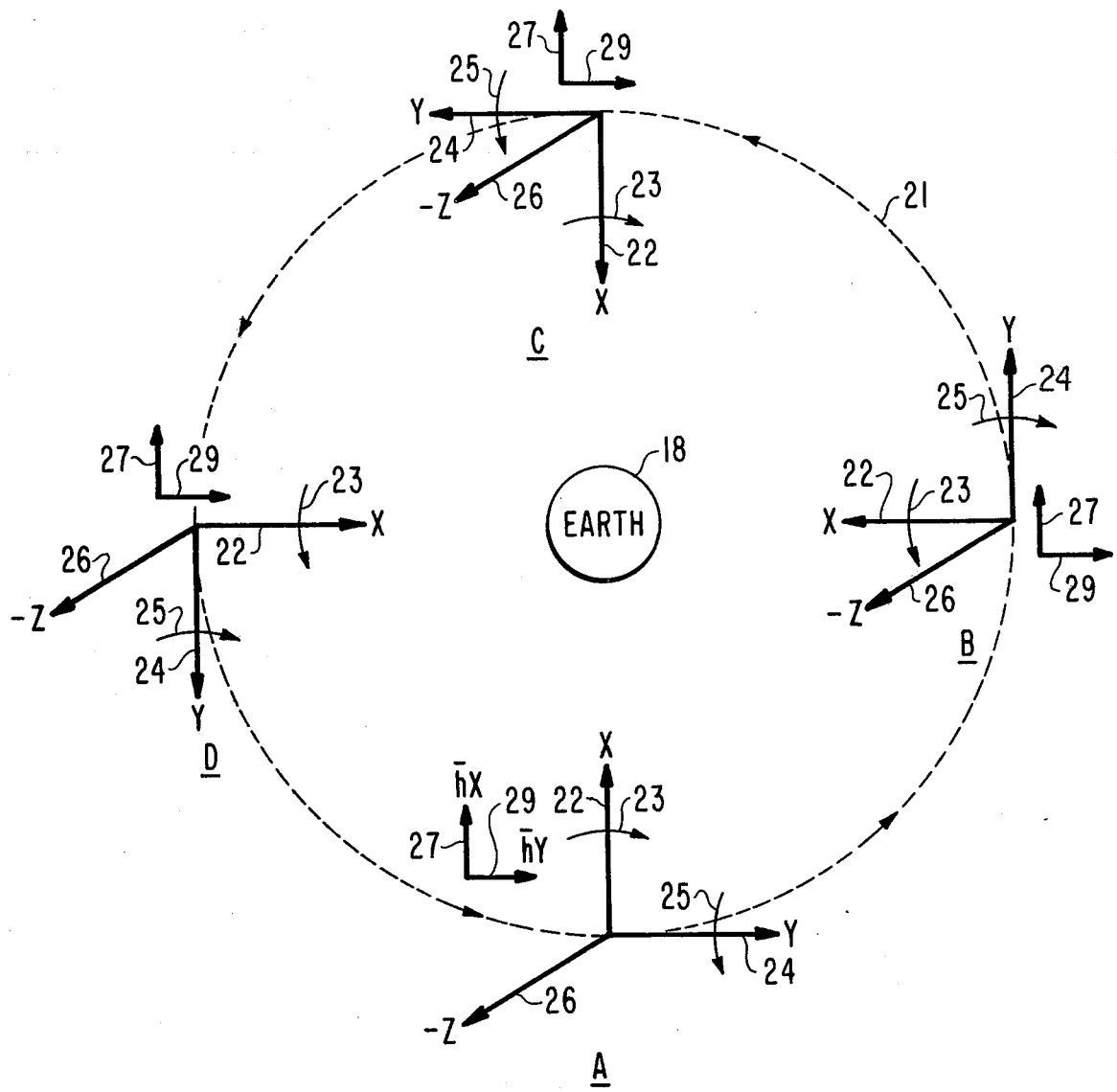
FIG. 2 is a drawing showing the spacecraft at four positions in its orbit.

Referring now to FIG. 2, there is shown the orbit of an earth pointing spacecraft. For purposes of simplicity, the spacecraft itself has not been shown. The X, Y, and Z axes 22, 24, 26 of spacecraft 10 are shown at four positions A, B, C, and D in the spacecraft's orbit 21 of earth 18. Orbit 21 is shown in the plane of the drawing with −Z axis 26 perpendicular to the orbit plane. It should be understood that mounted on the spacecraft's three mutually orthogonal axes X, Y, −Z, 22, 24, 26 are reaction wheels (not shown) which develop control torques so as to maintain the spacecraft's attitude.

Referring now to position A of FIG. 2, and assuming that the wheels on the X and Y axes 22, 24 are rotating in the directions shown by arrows 23 and 25, respectively, there is therefore directed along the X axis a component of angular momentum $\bar{h}x$, 27 and along the Y axis a component of angular momentum $\bar{h}y$, 29. When the spacecraft has orbited to position B which is approximately a quarter orbit from position A, the axes 22, 24 of the spacecraft will have rotated to the position shown. Due to the effect of gyroscopic cross-coupling the X and Y angular momenta 27, 29, of position A have interchanged, such that the Y angular momentum 29 is now directed along the X axis 22 and the X angular momentum 27 is now directed along the Y axis 24. This interchange of angular momenta causes errors in the attitude of the spacecraft and in order to compensate for these errors the X and Y wheels must now rotate in the direction indicated by arrows 23, 25 respectively. A comparison of position B with position A indicates that the X wheel must now rotate opposite to the direction it rotated at position A as shown by arrow 23. The Y wheel at position B continues to maintain the same direction of rotation it had at position A. It is thus seen that in traversing approximately one quarter of its orbit the spacecraft's X wheel would had to have undergone a speed reversal.

The spacecraft continues to orbit the earth and reaches position C which is approximately 90° from position B. As a result of gyroscopic cross-coupling the X and Y angular momenta 29, 27 of position B have now interchanged such that the Y angular momentum 29 (Position B) is now directed along the Y-axis 24 (Position C) and the X angular momentum 27 (Position B) is now directed along the X-axis 22 (Position C). In order to compensate for the attitude errors resulting from this interchange of angular momenta the Y wheel must now rotate in a direction opposite to the direction it rotated at position B as indicated by arrow 25. The X wheel continues to rotate in the same direction (23) it rotated at position B.

The spacecraft then moves to position D which is approximately 90° from position C. A comparison of position D with position C indicates that as a result of gyroscopic cross-coupling X angular momentum 27 of position C is now Y angular momentum. It is further seen that Y angular momentum 29 of position C is now X angular momentum. To compensate for the attitude error caused by this interchange of angular momenta the X wheel (position D) must now rotate opposite to the direction it rotated at position C as indicated by arrow 23. The Y wheel continues to rotate in the same direction it rotated at position C. As the satellite continues to orbit earth 18 it arrives again at position A. A comparison of position A with position D indicates that due to the effect of gyroscopic cross-coupling there has been an interchange of X and Y angular momenta and that the Y wheel is now rotating opposite to the direction it rotated at position D. It is therefore seen that the X and Y angular moment are interchanged on an approximate quarter orbit basis and that the X and Y wheels undergo two speed reversals per orbit.

It is to be noted that the Z axis wheel does not have to undergo any speed reversals. The time ($T_o$) for the Z axis 26 to rotate once around the earth, determines, the spacecraft pitchover rate which is thus defined as $2\pi/T_o$.

Having defined the spacecraft pitchover rate $\omega_0$ an angular velocity vector $\bar{\omega}$ can be defined as:

$$\bar{\omega} = -\omega_0 \bar{Z} \qquad (1)$$

where $\bar{Z}$ is a unit vector in the Z direction. Internal torques acting on the X and Y axes 22, and 24 due to gyroscopic cross-coupling between the X and Y wheels 12, 14, are then defined as:

$$\bar{\omega} \times \bar{H} \text{ where } H \text{ is the total spacecraft angular momentum;} \qquad (2)$$

It is seen, therefore, from equation (2) that there can be no gyroscopic cross-coupling on the Z axis, since $\bar{\omega}$ crossed with $\bar{H}_{\bar{z}}$ (the Z axis momentum vector), results in a zero magnitude vector. On the X and Y axis, however, there will be gyroscopic cross-coupling such that for the X axis, there will be a torque developed which is due to the gyroscopic cross-coupling of the Y axis wheel 14 and on the Y axis there will be a torque developed due to the gyroscopic cross-coupling of the X axis wheel 12. The gyroscopic cross-coupling torque on the X-axis $T_{xg}$ is determined by:

$$T_{xg} = + \omega_o H_y \qquad (3)$$

where $\omega_o$ is the spacecraft pitch over rate and $H_Y$ is the Y-axis angular momentum. The gyroscopic cross-coupling torque on the Y-axis $T_{yg}$ is determined by:

$$T_{wx} = -\omega_0 H_x \tag{4}$$

where $H_x$ is the X-axis angular momentum. Neglecting the product of inertia terms the X axis and Y axis angular momenta $H_x$ and $H_y$ respectively are determined as:

$$H_x = I_{WX} \omega_{FX} \tag{5}$$

where $I_{WX}$ is the X-axis reaction wheel moment of inertia and $\omega_{FX}$ is the X-axis wheel angular velocity and:

$$H_y = I_{WY} \omega_{FY} \tag{6}$$

where $I_{WY}$ is the Y axis wheel moment of inertia and $\omega_{FY}$ is the Y axis wheel angular velocity.

With the assumption of perfect attitude determination and neglecting the product of inertia terms, the sum of the external and internal torques acting on the spacecraft's axes 22, 24, 26, in component form, are:

$$\Sigma T_x = \dot{H}_x = T_{xe} - \omega_0 H_y \tag{7}$$

$$\Sigma T_y = \dot{H}_y = T_{ye} + \omega_0 H_x \tag{8}$$

$$\Sigma T_z = \dot{H}_z = T_{ze} \tag{9}$$

where $T_{xe}$, $T_{ye}$, $T_{ze}$, are the external disturbance torques on the X, Y, and Z axes respectively, $\omega_0 H_y$, $\omega_0 H_x$ are the gyroscopic cross-coupling torques on the X and Y axes respectively and $\dot{H}_x$, $\dot{H}_y$, $\dot{H}_z$ are the torques developed by the X, Y, and −Z axes reaction wheels respectively.

Figure 3:
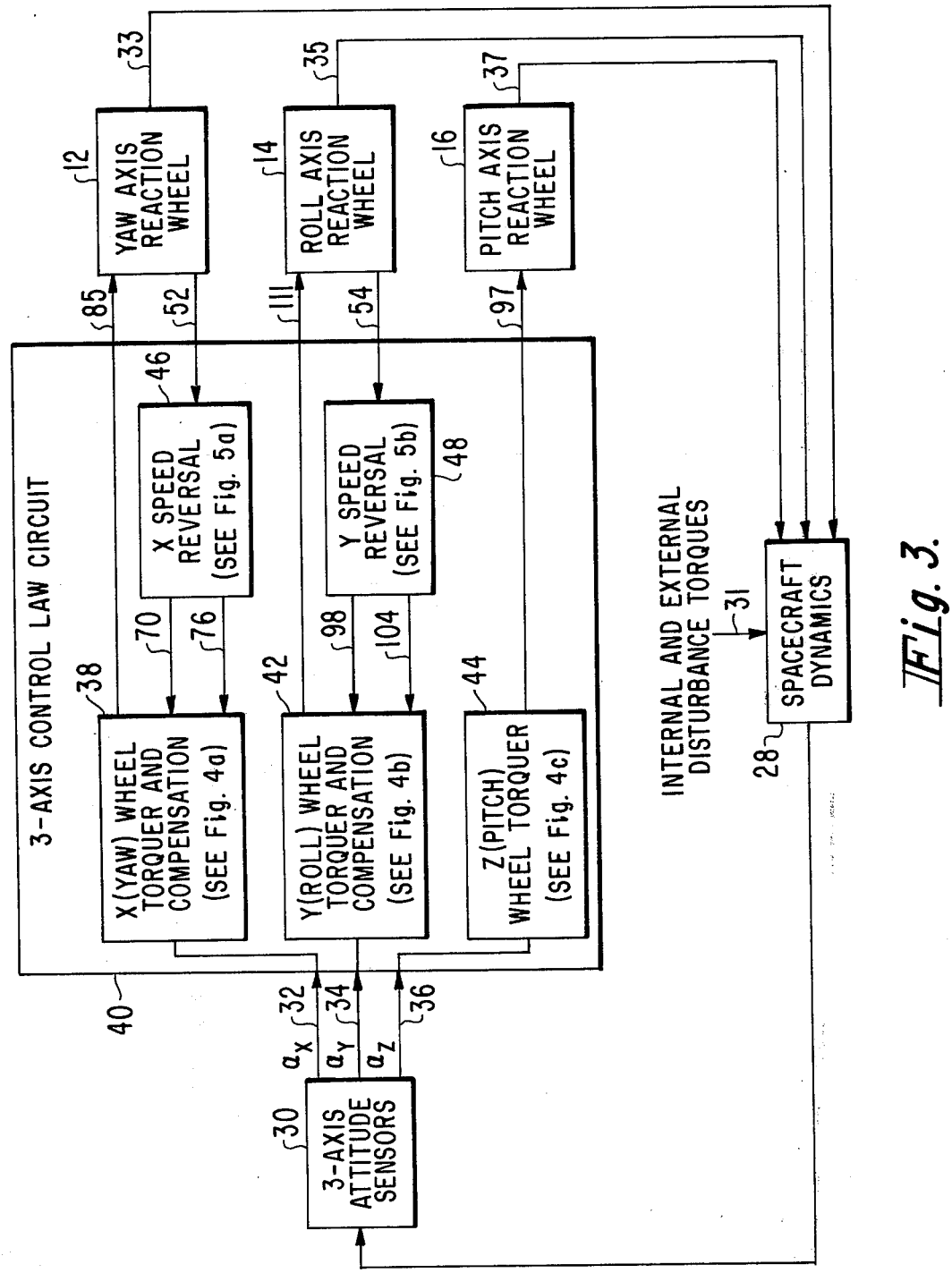
FIG. 3 is a block diagram of the control logic of a spacecraft embodying the present invention.

Referring now to FIG. 3, there is shown a block diagram of the three axis attitude control system according to the present invention illustrating, in general, the relative components of the spacecraft attitude control system. Circuits of the control logic in more detail shown in FIGS. 4 and 5 will be described later.

An array of attitude sensors 30 typically comprising either along or in combination gyroscopes, sun sensors, star sensors, earth horizon sensors are placed on each of spacecraft's 10 orthogonal axes 22, 24, 26. As is well known in the art such sensors provided a fixed reference to which the spacecraft may be oriented. For example, an attitude error signal will be generated by a star sensor mounted on one of spacecraft's 10 axes 22, 24, 26 pointed at a particular star if the axis on which the sensor is mounted should be disturbed. Signals representing respectively the attitude errors 32, 34, 36 of each axis 22, 24, 26 are coupled to the three axis conrol lam circuit 40, which is arranged to calculate in response to those errors the torque command to be sent to each wheel 12, 14, 16 so as to compensate for attitude errors.

Figure 4A:
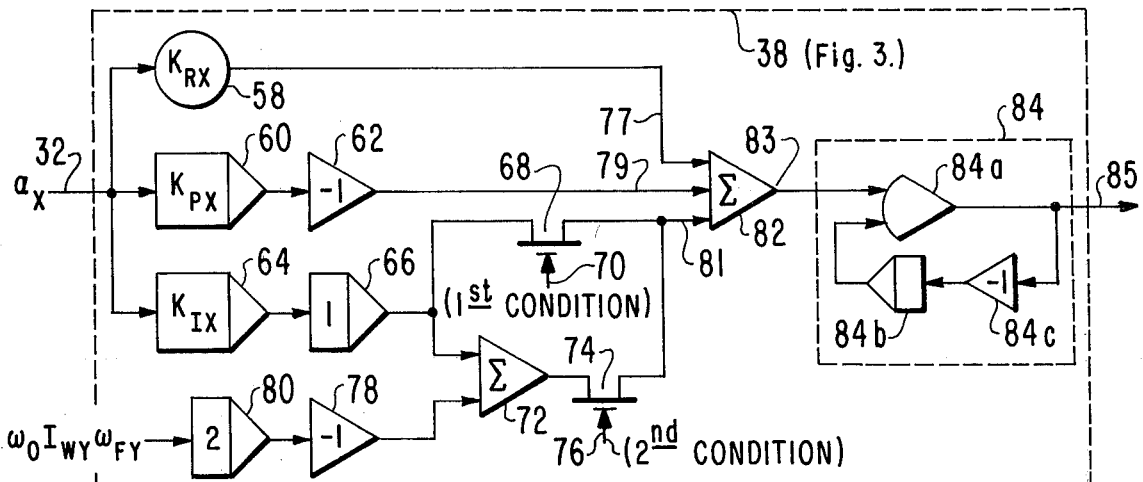
FIGS. 4A–C and 5A—B are detailed schematics of the control law logic portion of the system shown in FIG. 3.
Figure 4B:
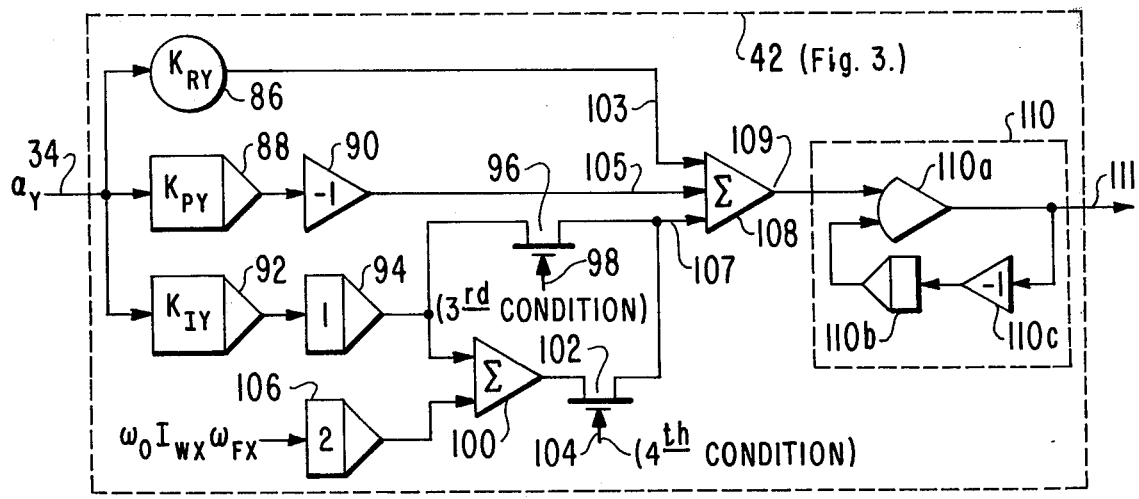
Figure 4C:
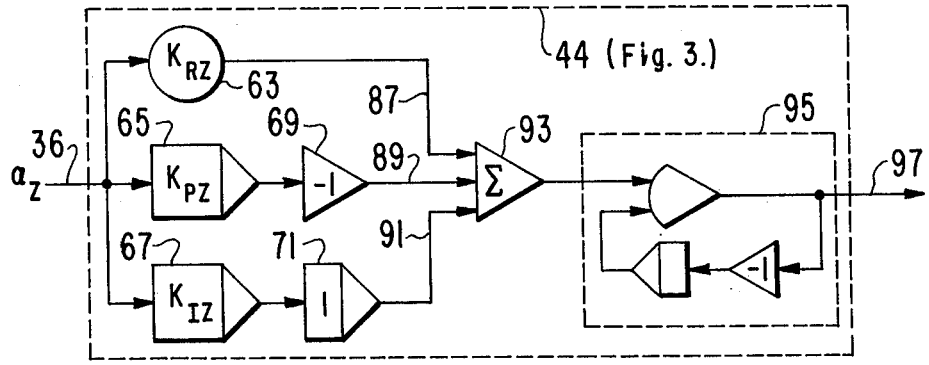
Figure 5A:
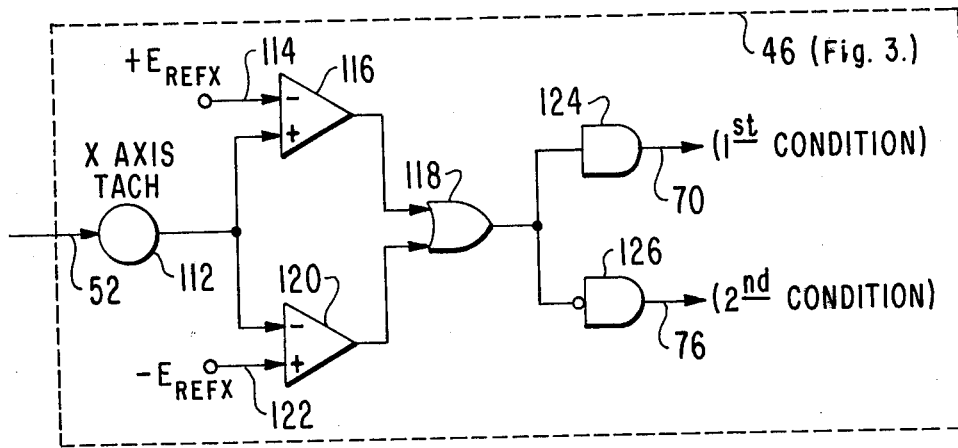
Figure 5B:
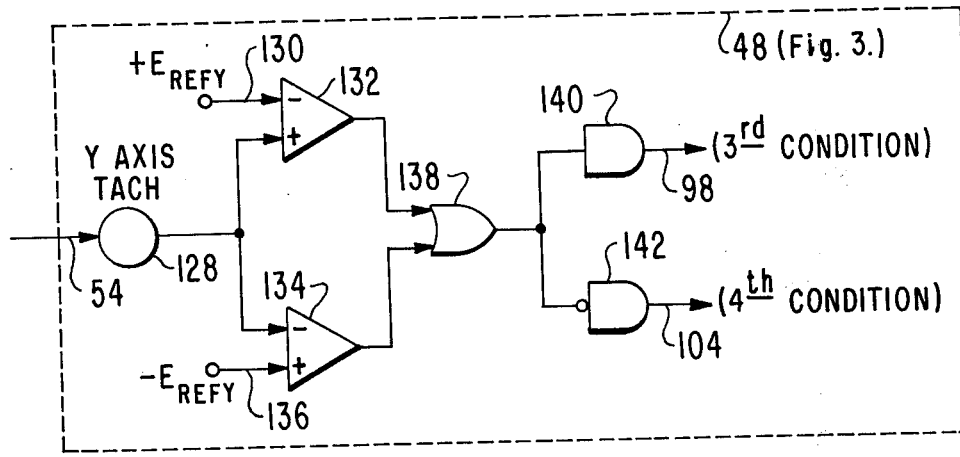

Control circuit 40 comprises torquer and compensation circuits 38, 42, 44 shown in more detail in FIGS. 4a, 4b, 4c for wheels 12, 14, 16 respectively in combination with the X and Y speed reversal circuits 46, 48 shown in more detail in FIGS. 5a, 5b. The operation of control circuit 40 will be described later. The torque command for each of the wheels 12, 14, 16 is a function of the attitude error or deviation of the axes 22, 24, 26 on which the wheel is mounted.

To meet the attitude accuracy requirements a type II servo or control system is used, to develop the wheel torque commands or attitude control signals for wheels 12, 14, 16. As is well known in the control system art, a type II system has a constant positional error due to a parabolic or constant-acceleration input term. For the type II system, the torque commands $T_{cx}$, $T_{cy}$, $T_{cz}$ to wheels 12, 14, 16, respectively are determined by:

$$T_{ci} = K_{pi} \alpha_i + K_{Ri} \dot{\alpha}_i + K_{Ii} \int \alpha_i dt \tag{10}$$

where $i$ can be either X, Y, or Z, $K_{pi}$ is the proportional gain, $\alpha_i$ is the attitude error; $\dot{\alpha}_i$ is the attitude rate error, $K_{Ri}$ is the rate gain and $K_{Ii}$ is the integral gain. It is to be understood that Equation (10) is the general expression for the wheel torque command developed by a type II system. To obtain the wheel torque command for X axis wheel 12, $i$ of Equation (10) would be replaced by X. Similarly $i$ would be replaced by Y or Z to obtain the torque command for Y wheel 14 or Z wheel 16. If more stringent attitude accuracy requirements are imposed then instead of using a type II servo or control system to develop the attitude control signals, a type III servo system may be required. As is well known in the art, a type III system has a constant positional error due to an input term which is the differential of acceleration. This input is commonly referred to as "jerk." For the type III system, the torque commands to wheels 12, 14, 16 would be determined by an expression identical to that for the type II system with the exception that an additional term, $K_{IIi} \int\int \alpha_i \, dtdt$ would be added onto the expression of Equation (10). This additional term, commonly referred to as the double integral term, distinguishes the control law of a type III system from that of type II system.

The wheel torque commands calculated and generated by circuit 40 are coupled to wheels 12, 14, 16 through suitable motor controls, not shown, so as to develop control torques and hence cause wheels 12, 14, 16 to change their speed and/or direction of rotation and thereby compensate for the attitude error. Internal and external disturbance torques are assumed to have caused spacecraft's 10 axes 22, 24, 26 to deviate from their correct attitude.

Spacecraft dynamics 28 is the response of spacecraft 10 to the torques 33, 35, 37 developed by wheels 12, 14, 16 respectively, and to the internal and external disturbance torques 31. Wheel torques 33, 35, 37 and disturbance torques 31 cause spacecraft 10 to change the attitude of each of its three axes 22, 24, 26. Sensors 30 as explained previously indicated whether the three axis attitude deviates from the desired spacecraft 10 attitude.

As explained previously, the roll and yaw wheels 12, 14 interchange their stored angular momenta on an approximate quarter orbit basis as a result of gyroscopic cross-coupling. These wheels will therefore reverse their speed direction twice per orbit. During these periods of speed reversals, internal wheel disturbances such as coulomb friction and motor cogging torque may become so large that the available motor torque is insufficient to prevent the wheel from coming to a complete stop for an extended period of time. Cogging torque is the variation in motor torque at very low speeds caused by variations in magnetic flux due to the alignment of the rotor and stator at various positions of the rotor. With one or both of the wheels stopped no control torque can be generated and an appreciable attitude error may result. In order to minimize this possible attitude error, the control circuit 40 is arranged with compensation logic 38, 42 to add compensation terms or torques and corrections to the wheel torque commands to the X axis and y axis wheels 12 and 14. These compensation terms and corrections will allow the yaw or roll axis wheel 12 or 14 to reverse its speed direction while maintaining a proper compensation for the gyroscopic cross-coupling between roll and yaw. The compensation term for gyroscopic cross-coupling will be added for a type II system to the integral term of the wheel torque command for the wheel which is about to undergo a speed reversal. The integral term will also be reversed in sign. This combination of reversal in sign of the integral term and the addition of the compensation term for gyroscopic cross-coupling minimizes the attitude error during periods of wheel speed reversal. For a type III system, the reversal of sign and addition of the compensation term occurs to the double integral term of the wheel torque command. When it is determined that the roll or yaw axis wheel angular velocity is in the range of 5 to 10 rpm, this indicates that the associated wheel is about to undergo a speed reversal. At this time, the compensation terms and corrections will be computed by the compensation logic 38, 42 of control logic 40 and added to the wheel torque command for the wheel about to undergo a speed reversal. For the X axis wheel 12, the compensation term $T_{Icx}$ is determined as:

$$T_{Icx} = -\omega_0 \cdot I_{wy} \cdot \omega_{fy} \quad (11)$$

where $\omega_0$ is the pitchover rate, $I_{wy}$ is the Y axis moment of inertia, and $\omega_{fy}$ is the angular velocity of the Y axis wheel. It should be understood that Equation (11) represents the internal gyroscopic cross-coupling torque on the spacecraft's 10 X axis 22 due to Y axis wheel 14. During steady state orbital operation or periods of non-wheel speed reversal, the compensation torque for gyroscopic cross-coupling is automatically included in the wheel torque command to the X axis wheel 12 as the X axis attitude error $\alpha_x$, reflects the effect of gyroscopic cross-coupling. When the X axis wheel 12 is about to undergo a wheel speed reversal, the integral term of the wheel torque command for a type II system is reversed in sign and twice the compensation torque is added to this integral term. For a type III system, the reversal of sign and addition of twice the compensation torque would occur to the double integral term. Thus, when the X axis wheel 12 is about to undergo a wheel speed reversal, the integral term of the wheel torque command for the type II system is now determined as:

$$K_{Ix} \int a_x dt = -K_{Ix} \int a_x dt + 2 T_{Icx} \quad (12)$$

where $K_{Ix}$ is the integral gain for the X axis, $\alpha_x$ is the X axis attitude error, and $T_{Icx}$ is the compensation term as determined by Equation (11). Physically this adjustment of the integral term of the X axis wheel torque command provides the X axis wheel 12 with the appropriate torque command to reverse its speed direction while maintaining the proper compensation for the gyroscopic cross-coupling between the X and Y axis wheels 12 and 14.

For the Y axis wheel, the compensation torque developed for the gyroscopic cross-coupling is determined as:

$$T_{Icy} = \omega_0 I_{wx} \omega_{fx} \quad (13)$$

where $\omega_0$ is the spacecraft pitchover rate, $I_{wx}$ is the moment of inertia along the X axis and $\omega_{fx}$ is the angular velocity of the X axis reaction wheel. This compensation torque is automatically included in the wheel torque command to the Y axis wheel 14 during on orbit steady state operations. When the Y axis wheel 14 is about to undergo a wheel reversal, it then becomes necessary to modify the integral term of the wheel torque command for a type II system to compensate for the gyroscopic cross-coupling between the X and Y wheels 12, 14. The integral term will also be reversed in sign.

Similar to the procedure described above for the X axis wheel 12, the compensation involves taking the negative of the integral term of the wheel torque command to the Y axis wheel 14 and adding to it twice the compensation torque $T_{Icy}$ such that the integral term of the wheel torque command to the Y axis wheel is determined as:

$$K_{Iy} \int a_y dt = -K_{Iy} \int a_y dt + 2 T_{Icy} \quad (14)$$

where $K_{Iy}$ is the integral gain of the Y axis, $\alpha_y$ is the attitude error of the Y axis, and $T_{Icy}$ is the Y-axis compensation torque for the gyroscopic cross-coupling between the X and Y axis wheels 12, 14. Equation (14) then provides the Y axis wheel 14 with the appropriate command previously, there reverse its speed direction while maintaining the proper compensation for the gyroscopic cross-coupling between the X and Y axis wheels 12 and 14. Normally the Z wheel 16 does not undergo any speed reversals as explained previously. During certain maneuvers, however, Z wheel speed reversal is possible. Minimization of any attitude errors occurring during this speed reversal is accomplished by simply reversing the sign of the integral term of the Z wheel torque command for a type II servo, (Equation 10). For a type III servo, the minimization of attitude errors introduced by Z wheel speed reversal is accomplished by reversing the sign of the double integral term. Terms to compensate for the effects of gyroscopic cross-coupling are not needed because as explained previously, there is no gyroscopic cross-coupling on the Z axis 26.

Referring now to FIGS. 4A–C and 5A–B, there are shown detailed schematics of the control logic 40 portion of the system shown in FIG. 3. FIGS. 4a, 4b, and 4c show analog circuits which may be used to implement the expression for the wheel torque command for a type II system for the X, Y, and −Z wheels 12, 14, 16, respectively. The circuits of FIGS. 4a and 4b are identical and correspond respectively to the X (Yaw) wheel torquer and compensation 38 and Y (Roll) wheel torquer and compensation 42 of control law circuit 40. These circuits include the components to develop the necessary compensation terms and corrections during periods of wheel speed reversal. The circuit of FIG. 4c corresponds to the Z wheel torquer 44 of control law circuit 40. This circuit does not include the components to develop the compensation term and corrections because as explained previously, the −Z axis wheel 16 normally does not undergo a speed reversal. FIGS. 5a and 5b show two identical circuits corresponding to the X and Y speed reversal circuits 46, 48 of FIG. 3. These circuits may be used to determine whether or not the X and Y axis wheels 12 and 14 are about to undergo speed reversals.

Referring now to FIGS. 4AC, the circuit of FIG. 4a comprises four operational amplifiers 60, 64, 66, 80 suitably arranged to act as integrators, summing amplifiers 72, 82; metal oxide silicon field effect transistors (MOS FETS) 68, 74; inverters 62, 78; and an implicit differentiator 84. Differentiator 84 comprises a high gain amplifier 84a in combination with an integrator 84b and inverter 84c. Integrator 80, inverter 78, summing amplifier 72, and FET 74 provide the compensation terms and corrections to the X wheel torque command durin periods of wheel speed reversals. With the exception of inverter 78, the circuit of FIG. 4b is identical to the circuit of FIG. 4a. The circuit of FIG. 4c comprises three operational amplifiers 65, 67, 71 suitably arranged to act as amplifiers, a summing amplifier 93 and an implicit differentiator 97. As the Z axis wheel normally does not undergo any speed reversals, the circuit of FIG. 4c does not need the additional integrators, summing amplifiers, and FETS shown in FIGS. 4a and 4b.

The operation of the circuit of FIG. 4a for the X axis wheel torque command will now be explained in detail. As explained previously, the X axis wheel torque command $T_{cx}$ for a type II system is based on Equation (10) with $i = X$:

$$T_{cx} = K_{px}\alpha_x + K_{Rx}\dot{\alpha}_x + K_I \int \alpha_x dt \qquad (15)$$

where $K_{px}$ is the X axis proportional gain, $\alpha_x$ is the X axis attitude error, $K_{Rx}$ is the axis rate error, $\dot{\alpha}_x$ is the X axis attitude rate error and $K_{Ix}$ is the X axis integral gain. If the above expression (15) is integrated, we then have the integral of the wheel torque command for the X axis wheel, which is determined as:

$$\int T_{cx} dt = K_{Rx}\alpha_X + K_{px} \int \alpha_x dt + K_{Ix} \int\int \alpha_x dt dt \qquad (16)$$

The output signal 83 of summing amplifier 82 is the integral of the X axis wheel torque command. Summing amplifier 82 is an operational amplifier suitably arranged as is well known in the art to have an output signal 83 which is equal to the sum of its input signals 77, 79, 81. This output signal 83 is then differentiated so that the output signal 85 of differentiator 84 is the X axis wheel torque command $T_{cx}$.

The input to the circuit of FIG. 4a is the X axis attitude error $\alpha_x$ 32. This attitude error is determined by the three axis attitude sensors 30 (FIG. 3). Integrator 60 integrates the attitude error (32) such that input 79 to summing amplifier 82 is the integral term of Equation (16). Integrator 60 is an operational amplifier suitably arranged with a resistor and a capacitor to perform the mathematical operation of integration. As is well known in the art, the gain of an operational amplifier acting as an integrator is directly proportional to the inverse of the product of the amplifier's associated resistor and capacitor. The gain of integrator 60 is adjusted to be equal to $K_{px}$, the proportional gain of the X axis wheel torque command, Equation (15). Inverter 62 is used to maintain proper sign convention at input 79 as integrator 60 not only integrates but also inverts signals such that its output is proportional to the negative of the integral of the input. Thus, the input 79 to summing amplifier 82 is:

$$K_{px} \int \alpha_x dt \qquad (17)$$

Input 77 to summing amplifier 82 is:

$$K_{Rx}\alpha_x \qquad (18)$$

where $K_{Rx}$ 58 is the rate gain for the X axis wheel torque command. Input 81 to summing amplifier 82 is:

$$K_{Ix} \int\int \alpha_x dt dt \qquad (19)$$

where $K_{Ix}$ is the integral gain for the X wheel torque command.

As seen in FIG. 4a, connected between the output of integrator 66 and input 81 of summing amplifier 82 is a network consisting of two field effect transistors (FETS) 68, 74 and a summing amplifier 72. As explained previously, the integral term of the wheel torque command will be modified by reversing its sign and adding in the compensation terms for gyroscopic cross-coupling if the wheel is about to undergo a speed reversal. FETS 68, 74, operate as ON/OFF switches. Normally they are in the OFF position. If FET 68 should close and thereby conduct the term calculated by integrators 64, 66 is directly connected to input 81 of summing amplifier 82. Thus, there is no modification of the integral term of the wheel torque command. If the X axis wheel should be undergoing a speed reversal, it then becomes necessary to modify (as explained previously) the wheel torque command by adding in twice the compensation torque for the X axis wheel and reversing the sign of the integral term. This compensation torque is a torque needed as previously indicated to compensate for the gyroscopic cross-coupling between the X axis and Y axis wheels 12, 14. When X axis wheel 12 is about to undergo a speed reversal FET 74 closes and thus conducts. FET 68 remains in the open position, and the output of integrator 66 is then feed into summing amplifier 72. Summing amplifier 72 sums the output of integrator 66 with the expression determined by integrator 80 and inverter 78. The output of summing amplifier 72 is then:

$$K_{Ix} \int\int \alpha_x dt dt + 2 \cdot \omega_0 I_{wy} \omega_{fy} \int dt \qquad (20)$$

Thus when the X axis wheel is to undergo a speed reversal, the output 83 of summing amplifier 82 is:

$$K_{Rx}\alpha_x + K_{px} \int \alpha_x dt - K_{Ix} \int\int \alpha_x dt dt - 2\omega_0 I_{wy} W_{fy} \int dt \qquad (21)$$

When this output 83 is differentiated, the output 85 of differentiator 84 is the wheel torque command including the necessary compensation term and correction that will be issued to the X axis wheel when it is undergoing a speed reversal.

The circuit of FIG. 4b is identical to the circuit of FIG. 4a with the exception that the input is the Y axis attitude error $\alpha_y$ and the compensation term for gyroscopic cross-coupling is:

$$\omega_0 I_{wx} \omega_{fx} \qquad (22)$$

where $\omega_0$ is the spacecraft pitchover rate, $I_{wx}$ is the moment of inertia along the X axis and $\omega_{fx}$ is the speed of rotation of the X axis wheel. When the Y axis wheel 14 is not about to undergo a speed reversal, FET 96 will close thereby developing a wheel torque command $T_{cy}$, which does not include the compensation term and corrections for wheel speed reversal. If however, the Y axis wheel 14 is about to undergo a speed reversal, FET 102 will close, thereby adding into the wheel torque command the necessary compensation term and correction for the attitude error occurring during the speed reversal.

FETS 68 and 74 of FIG. 4a are controlled by signals 70, 76 respectively, developed by the circuit of FIG. 5a. The circuit of FIG. 5a determines whether or not the X wheel 12 is about to undergo a speed reversal. Similarly, FETS 96 and 102 of FIG. 4b are controlled by signals 98, 104, respectively, developed by the circuit of FIG. 5b. The circuit of FIG. 5b determines whether or not the Y wheel 14 is about to undergo a speed reversal.

Two possible conditions exist for each of the reaction wheels 12, 14. These conditions are tabulated in Table 1.

TABLE I

| CONDITION | RESULT |
| --- | --- |
| 1st | X wheel no speed reversal |
| 2nd | X wheel about to undergo a speed reversal |
| 3rd | Y wheel - no speed reversal |
| 4th | Y wheel about to undergo a speed reversal |

The 1st and 2nd conditions are the output signals 70, 76, respectively, of the circuit of FIG. 5a and the 3rd and 4th conditions are the output signals 98, 104, respectively, of the circuit of FIG. 5b. The operation of these circuits will be described later.

The circuit of FIG. 4c which corresponds to block 44 of FIG. 2 develops the wheel torque command for Z axis wheel 16. This circuit is identical to the circuits of FIGS. 4a, and 4b, with the exception that the additional components to develop compensation terms and corrections are not needed as Z wheel 16 normally does not undergo any speed reversals. Accordingly, the operation of the circuit of FIG. 4c need not be described further.

If the Z wheel were to undergo a speed reversal, the circuit of FIG. 4c could be modified to provide the necessary corrections for the resulting attitude error. This modification would consist of adding a network consisting of a first FET connected in parallel with a series combination of a second FET and an inverter. This network would be added to the circuit between the output of integrator 71 and input 91 to summing amplifier 93. The FET's function as ON/OFF switches and would normally be OFF. When the Z wheel was about to undergo a speed reversal the FET connected in series with the inverter would close and thereby conduct, causing the integral term of the torque command to reverse in sign. This reversal in sign minimizes the attitude error occurring during periods of Z wheel speed reversal.

Referring now to FIG. 5a, there is shown that portion 46 of the control law circuit 40 (FIG. 3) which determines whether or not X wheel 12 is about to undergo a speed reversal. The circuit of FIG. 5a comprises a bipolarity comparator formed of elements 116, 120, and OR gate 118 whose output is connected to AND gate 124 and NAND gate 126. The input signal to the bipolarity comparator is derived from a tachometer 112 which measures the speed and direction of rotation of X axis wheel 12. Wheel speed and direction of rotation may also be determined by other techniques well known in the art. One of these techniques consists of mounting Hall elements in the gap between rotor and stator of the wheel's associated motor drive. The output of the Hall elements as is well known in the art is then proportional to the speed of the wheel and also indicates the direction of rotation. Thus, the input signal to the bipolarity comparator may also be derived directly from Hall elements on the wheels motor drive. Wheel speeds range typically from $-8000$ to $+8000$ rpm. The bipolarity comparator is available as a standard element such as RCA type CA3060.

Since the purpose of the bipolarity comparator is to determine if the wheel is about to undergo a speed reversal, a reduced speed condition is sensed from the input from tachometer 112 which is a voltage representative of X axis wheel 12 speed. Elements 116 and 120 acting as summing amplifiers will then determine whether or not the tachometer 112 input is less than or greater than a reference voltage $E_{REFX}$. This reference voltage is chosen to correspond to a wheel speed in the range of 5 to 10 rpm. If the X axis wheel is not about to go a speed reversal, the input from the X axis tachometer 112 is a voltage which is greater in magnitude than $E_{REFX}$. The output of comparator 116 is thus a positive voltage or a "one." The output of comparator 120 is thus a negative voltage or a "zero" and the output of OR gate 118 is thus a one. AND gate 124 thus has an output 70 which is a one and NAND gate 126 has an output 76 which is a zero. Output 70 of AND gate 124 is connected to the bias 70 of FET 68 of FIG. 4a. The output 76 of NAND gate 126 is connected to the bias 76 of FET 74 of FIG. 4a. With the X axis wheel 12 rotating at a speed greater than 5 to 10 rpm, the output 70 of AND gate 124 is a one, the output 76 of AND gate 126 is a zero, and thus it is seen that FET 68 (FIG. 4a) will conduct resulting in a torque command to the X axis wheel which does not include the compensation term and correction for wheel speed reversal. If the X axis wheel 12 is rotating in the opposite direction at a speed which is greater than 5 to 10 rpm, then the input from tachometer 112 to comparator 120 will be a negative voltage which is greater than minus $E_{REFX}$. Thus, the output of comparator 120 will be a one, the output of comparator 116 will be a zero, and the output of OR gate 118 will be a one. The output 70 of AND gate 124, will be a one, the output 76 of NAND gage 126 will be a zero, and as seen in FIG. 4a, FET 68 will conduct, FET 74 will remain off, thereby giving a torque command to the X axis wheel 12 which includes no compensation term and correction for wheel speed reversal.

If the X axis wheel is about to undergo a speed reversal, the input to FIG. 5a from the tachometer 112 will be a voltage which will fall in the range between $+E_{REFX}$ and $-E_{REFX}$. Under these circumstances, the respective outputs of comparators 116 and 120 will be zeros, the output of OR gate 118 will also be a zero and the output of AND gate 124 will be a zero and the output 76 of NAND gate 126 will be a one. As seen at FIG. 4a with the output of 76 of NAND gate 126 a one, FET 74 will conduct, and with the output 70 of AND 124 a zero, FET 68 will remain off and, as explained previously, the compensation term and correction for periods of wheel speed reversal will then be added in the wheel torque $T_{cx}$.

FIG. 5b which corresponds to the portion 48 of the control law circuit 40 (FIG. 3) is the circuit which is used to determine whether or not the Y axis wheel is about to undergo a speed reversal. The circuit operates in a manner identical to that explained for FIG. 5a, with the exception that the input to FIG. 5b is from the Y axis tachometer 128. This input may also be from Hall elements mounted on the motor drive for Y wheel 14. As for the X axis circuit (FIG. 5a) elements 136, 134, and 138 represent a bipolarity comparator which is available commercially as RCA type CA3060. The wheel speed reversal. It is then necessary to add into the wheel torque command to be sent to that wheel the terms and corrections to compensate for the attitude errors that occur as a result of this wheel speed reversal. The program proceeds by flow arrow 153 to decision operation 154 where it determines whether the wheel which is about to undergo a speed reversal is the X axis wheel 12. If a YES decision is made at decision operation 154 then at operation 159, the program calculates the compensation term to be added to the integral term of the wheel torque command to be sent to X axis wheel 12. At operation 162, the integral term of the wheel torque command to be sent to the X axis wheel 12 is adjusted so that proper compensation for attitude errors is obtained. As explained previously, the compensation term and correction is calculated in operation 162 by taking the integral term of the wheel torque command previously computed in operation 150, reversing its sign and adding to it, twice the term calculated in operation 159. The term calculated in operation 159 represents the effects of gyroscopic cross-coupling between the X axis wheel 12 and the Y axis wheel 14. Flow arrow 165 then directs the program to operation 167 where as explained previously, the wheel torque command to be sent to the X axis wheel, is computed. By parallelogram 168 this wheel torque command is coupled through conventional D/A converter 169 to X axis wheel 12. The program then proceeds as explained previously.

Returning now to decision operation 154, if a NO decision is made at decision operation 154, this indicates that it is not the X axis wheel which is about to undergo the wheel speed reversal. It has been determined at decision operation 152 that one of the two wheels 12 or 14 is about to undergo a wheel speed reversal and as decision operation 154 has determined that it is not the X axis wheel 12, is must be the Y axis wheel 14. The program then proceeds by flow arrow 155 to operation 160 where the compensation term to be added to the integral term for the Y axis wheel 14 is calculated. This compensation term is a function of the gyroscopic cross-coupling between the X axis and Y axis wheels 12 and 14. Operation 163 then changes the sign of the integral term calculated in operation 150 and adds to it twice the compensation term calculated in operation 160. This is then the required form for the integral term of the Y axis wheel torque command so that the large attitude errors associated with Y axis wheel speed reversals can be minimized. The program then proceeds to operation 167 where the wheel torque command for the Y axis wheel 12, can now be calculated. This wheel torque command is then coupled to the Y wheel 12 through parallelogram 168 and conventional D/A converter 169. The program then proceeds as explained previously.

Figure 6:
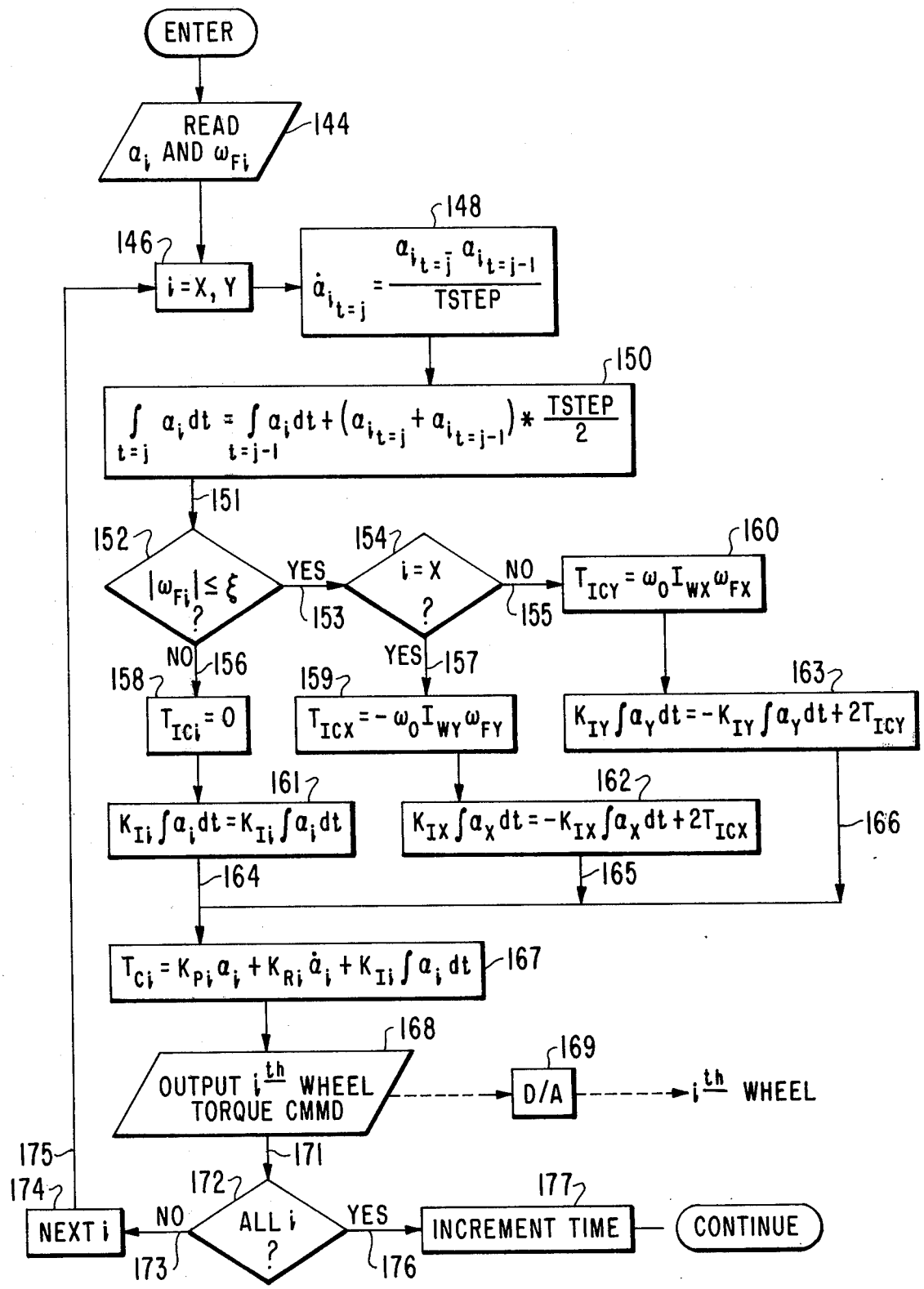
FIG. 6 is a flow chart of a wheel control torque algorithm for use in a computer utilizing the method of the present invention.

The flow chart of FIG. 6 illustrates one form of a control law and compensation determining algorithm. As known in the art any suitable algorithm may be devised to generate the same or equivalent result.

A digital computer may also be programmed to perform the calculation of the -Z wheel torque command. Circuitry to perform this calculation has been shown in FIG. 4c. As -Z wheel 16 does not normally undergo any speed reversals, the flow chart for its control law determining algorithm (not shown) would consist of the steps of:

1. Loading into the computer memory the Z axis attitude error, $\alpha_Z$;

2. Computing the attitude rate error as is done by operation 148 of FIG. 6;
3. Calculating the integral term of the wheel torque command as is done by operation 150 (FIG. 6);
4. Calculating the wheel torque command $T_{cz}$ for Z wheel 16 as is done by operation 167 (FIG. 6);
5. Coupling the wheel torque command to Z wheel 16 by a suitable D/A converter (169 of FIG. 6); and
6. Incrementing time (operation 177 of FIG. 6) so that the torque command may be calculated at the next increment of time;
7. Returning to Step 1.

If the Z axis wheel should undergo a speed reversal, the control law determining algorithm can be modified so that the resultant attitude errors are minimized. The modification would consist of adding between steps 3 and 4 the following additional operations:

3a. Determining if the Z wheel is about to undergo a speed reversal as is done by decision operation 152 (FIG. 6). If the answer is NO the algorithm would skip to Step 4. If the answer is YES the algorithm would proceed to Step 3b;

3b. Reversing the sign of the integral term of the wheel torque command calculated in Step 3 as is done in operation 162 or 163 of FIG. 6. The compensation term for gyroscopic cross-coupling is not needed as there is no gyroscopic cross-coupling on -Z axis 26. The algorithm would then proceed to Step 4.

A spacecraft attitude control system implementing the present invention provides several advantages. First, a light weight and less costly three axis attitude control system can be used which employs only three mutually orthogonal wheels. This it will be appreciated, is in contrast to prior art three axis attitude control systems which provide for either multiple wheels or combinations of control moment gyroscopes on each orthogonal axis. Second, the use of three mutually orthogonal wheels provides for simplification of the wheel torque commands. Third, the addition of compensation terms and corrections during periods of wheel speed reversal provides for simplification of the control laws.

It will now be appreciated that according to the present invention, deviations of the satellite from a predetermined reference attitude caused by relatively low rotational speeds and stoppage of the wheels 12, 14, 16 are reduced substantially to zero. The reversal of rotation of any wheel is anticipated by comparing the wheel speed to a threshold value of speed. This threshold value of speed is in the order of 0.1 percent of the maximum speed or rotation of the wheels. Thus, for wheels having a maximum speed of rotation of 8000 rpm, the threshold value of speed is in the order of 5 to 10 rpm.

It should be further appreciated that the yaw and roll reaction wheels 12, 14, reverse their direction of rotation twice per orbit. Normally, the pitch wheel 16 does not undergo a rotation reversal. Pitch wheel rotation reversal is possible, however, during certain maneuvers, such as satellite reorientation. It should further be appreciated that during periods when no one of the three wheels will be reversed, attitude deviations caused by a combination of external and/or internal disturbance torques are minimized by causing each wheel to generate control torques be rotated in response solely to its associated wheel torque command signal (Equation 10). When one of the wheels is about voltage $E_{REFY}$ represents a wheel speed of about 5 to 10 rpm. As explained previously for FIG. 5a, if the Y axis wheel 14 is not about to undergo a speed reversal, the output 98 of AND gate 140 will be a one and the output 104 of AND gate 142 will be a zero. These outputs 98 and 104 are connected respectively to FETS 96 and 102 of FIG. 4b. If the Y axis wheel 14 is about to undergo a speed reversal, the output 98 of AND gate 140 is a zero and the output 104 of AND gate 142 is a one, thereby enabling FET 102 (FIG. 4b). The appropriate compensation term and correction can then be added into the wheel torque command for the Y axis wheel 14.

FIGS. 4a, 4b, 4c, 5a, and 5b are circuit diagrams of one embodiment of the control law and compensation determining apparatus. The invention may also be implemented by use of a properly programmed digital computer in combination with certain system elements to generate improved control laws.

FIG. 6 illustrates a flow chart for a control law and compensation determining algorithm for a type II servo. The flow chart may be used for programming a digital computer to perform the calculations performed by the circuitry shown in FIGS. 4a, 4b, and 5. The algorithm of FIG. 6, in brief, provides the steps to compute the wheel torque command signals for the X and Y wheels 12, 14 including compensation terms and corrections if needed. At a given instant of time, the algorithm of FIG. 6 calculates the wheel torque commands, compensation torques, and corrections, if any, first for the X axis wheel 12 and then for the Y axis wheel 14. Once the wheel torque commands for both wheels 12 and 14 hve been calculated, the program then proceeds to the next instant of time and recalculates the wheel torque commands.

Proceeding now to a description of FIG. 6, a parallelogram labeled 144 represents loading of the attitude errors $\alpha_i$ and wheel angular velocities $\omega_{Fi}$ into appropriate registers and the memory of the computer. As explained previously, the attitude errors are determined by the three axis attitude sensors 30. The wheel angular velocities are determined by the tachometers 112 and 128 connected to the X and Y axis reaction wheels 12 and 14. These angular velocities may also be determined by Hall elements mounted in the wheel's associated motor drive. The first operation performed in the flow chart is labeled 146. It represents selecting one of the axes, either X or Y of the spacecraft, so that the wheel torque command for that axis may be calculated.

Operations 148 and 150 compute the various terms of the wheel torque command. Operation 148 calculates the attitude rate error. The attitude rate error is the rate of change of the attitude error over the given increment of time. The attitude error at the present interval of time $t = j$ has been determined from the attitude sensors 30. The attitude error at the prior instant of time $t = j - 1$ has been previously stored in the memory of the computer. Operation 148 then calculates the difference between these two attitude errors and divides them by the increment of time, TSTEP where:

$$TSTEP = T_j - T_{j-1} \qquad (23)$$

The program then proceeds to operation 150, which calculates the integral term of the wheel torque command. This integral term is calculated as the sum of the integral term computed at the prior interval of time $t = j - 1$ which had been stored in the computer memory plus the increment or change in the integral term over the time interval TSTEP. The integral term calculated by operation 150 is stored in memory in place of the integral term previously calculated at $t = j - 1$ Flow arrow 151 then directs the algorithm to an operation which is a decision operation 152. Decision operation 152 determines if the angular velocity of the selected wheel either X or Y 12 or 14 is less than or equal to a fixed constant whose absolute magnitude is in the order of 5 to 10 rpm. This constant indicates, as explained previously, whether or not the selected wheel is about to undergo a speed reversal. If a NO decision is made at decision operation 152, this indicates that the selected wheel 12 or 14 is not about to undergo a speed reversal and the program then proceeds by flow arrow 156 to operation 158. As the selected wheel is not about to undergo a speed reversal, operation 158 sets the compensation term, $T_{ci}$, of the wheel torque command equal to zero. As explained previously, the compensation term is added to the negative of the integral term of the wheel torque command when the selected wheel 12 or 14 is about to undergo a speed reversal. As the compensation term has been set equal to zero by operation 158, in operation 161, the integral term of the wheel torque command need not be modified and reversed in sign and is set equal to that which has been calculated in operation 150. Flow arrow 164 then directs the program to operation 167 which calculates the wheel torque command for the selected wheel 12 or 14. As explained previously, in described Equation (10), the wheel torque command is the sum of three terms, one of which, $K_{pi} \alpha_i$, is directly proportional to the attitude error on the selected axis, another of which, $K_{Ri}\dot{\alpha}_i$, is proportional to the attitude rate error as previously calculated in operation 148 on the selected axis, and the third term of which, $K_{Ii} \int \alpha_i dt$, is proportional to the integral of the attitude error as previously calculated in operation 150 for the selected axis. The program then proceeds to parallelogram 168 where the wheel torque command calculated in operation 167 is coupled to the selected wheel 12 or 14. The torque command is coupled through a conventional D/A converter 169 to the motor drive of the selected reaction wheel as represented by block 170. The program then proceeds by flow arrow 171 to decision operation 172 which determines whether for the given instant of time $t = j$ the wheel torque command has been computed for both the X and Y wheels 12 and 14. If a NO decision is made at decision operation 172, the program proceeds to operation 174 where the next axis is selected so that the wheel torque command may be computed at this instant of time $t = j$ for that axis. Flow arrow 175 then directs the program back to operation 146.

If a YES decision is made at decision operation 172, this indicates that at this particular instant of time, $t = j$, the wheel torque commands for both the X and Y axis wheel 12 and 14 have been calculated. The program then proceeds to operation 177 which increments time to $t = j +$ so that the wheel torque commands may now be computed for the X and Y axis wheels 12 and 14 at this new interval of time.

Returning now to decision operation 152, if a YES decision is made at decision operation 152, this indicates that for the selected wheel either X or Y 12 or 14, the wheel speed is less than or equal to this fixed constant. Thus, the selected wheel is about to undergo a to undergo a rotation reversal, its associated torque command signal must be modified or altered so as to cause the wheel to increase its unaltered rate of wheel speed reduction and to increase its unaltered rate of increase of wheel speed. This alteration in the torque command signal also minimizes the period of time during which the wheel may stop at zero speed caused by the cogging torque described earlier. The alteration to the command signal depends upon the type of servo used to generate the command signal and which one of the three wheels is about to undergo a rotation reversal.

For a Type II servo the alteration consists of reversing the sign of that component of the command signal which is proportional to the integral of the attitude error signal. In the absence of attitude errors, the integral component of the command signal rotates the wheel at a constant speed which is sufficient to compensate for internal wheel disturbances. For the yaw and roll wheels, an additional signal to compensate for gyroscopic cross-coupling between the wheels is added to the associated command signal. For the pitch wheel, no compensation term is needed as there is no gyroscopic cross-coupling on pitch axis 26.

Similarly for a Type III servo, the alteration consists of reversing the sign of that component of the command signal which is proportional to the double integral of the attitude error signal. In the absence of attitude errors, the double integral component of the command signal rotates the wheel at a constant speed which is sufficient to compensate for internal wheel disturbances. Compensation signals are added to the command signals for the yaw and roll wheels as described above.

What is claimed is:

1. An attitude control system for a substantially zero momentum satellite having three mutually perpendicular axes, comprising:
    a. attitude determination means mounted on said satellite for detecting deviations of each of said mutually perpendicular axes from a predetermined reference attitude and generating attitude error signals in response to said detected deviations of said predetermined attitude;
    b. first reaction wheel, second reaction, and third reaction wheels, each of said wheels mounted on said satellite on a respective axis parallel with a respective one of each of said three mutually perpendicular axes, each of said wheels being rotationally di-directional;
    c. control means responsive to said attitude error signals for generating three torque command signals each associated with a respective one of each of said three wheels, each of said torque command signals causing the associated one of said respective wheels to develop control torques and rotate at an angular velocity and direction of rotation to correct and reduce substantially to zero any deviations that are detected;
    d. means responsive to a threshold value of speed of each of said wheels for generating an anticipation signal manifesting an anticipated reversal of rotation of a given wheel;
    e. said deviations from a predetermined reference attitude including deviations caused by torques generated by any of said wheels when operating at relatively low rotational speeds including zero speed, and
    f. means included in said control means responsive to said anticipation signal for altering each of said wheels torque command signals to increase the rate of reduction of said wheel rotation speed to zero and to increase the rate of increase of said wheel rotation speed after said wheel rotation is reversed, whereby deviations due to relatively low rotational speeds and stoppage of said wheels are reduced substantially to zero.

2. The system according to claim 1 wherein said attitude determination means includes gyroscopes mounted on each of said three mutually perpendicular axes.

3. The system according to claim 1 wherein said means responsive to a threshold value of speed is a bipolarity comparator and said threshold value of speed is in the order of 0.1 percent of the maximum speed or rotation of said wheels.

4. The system according to claim 1 wherein said control means is a Type II servo and further includes:
    a. means for generating a signal proportional to said attitude error signal;
    b. means for generating a signal proportional to the rate of change of said attitude error signal;
    c. means for generating a signal proportional to the integral of said attitude error signal; and
    d. means for generating said torque command signals as the sum of said signal proportional to said attitude error signal, plus said signal proportional to said attitude rate error signal, plus said said signal proportional to said integral of said attitude error signal.

5. The system according to claim 4 wherein said means for altering each of said torque command signals to said first and said second wheels further includes:
    a. means for reversing the sign of said first and second command signals proportional to the integral of said attitude error signal;
    b. means for adding to said sign-reversed command signals, a signal to compensate for gyroscopic cross-coupling between said first and second wheels.

6. The system according to claim 5 wherein said compensation signal for said first wheel is proportional to said angular velocity of said second wheel.

7. The system according to claim 5 wherein said compensation signal for said second wheel is proportional to said angular velocity of said first wheel.

8. The system according to claim 4 wherein said means for altering said torque command signal for said third wheel further includes:
    means for reversing the sign of said third command signal proportional to the integral of said attitude error signal.

9. The system according to claim 1 wherein said control means is a Type III servo and further includes:
    a. means for generating a signal proportional to said attitude error signal;
    b. means for generating a signal proportional to the rate of change of said attitude error signal;
    c. means for generating a signal proportional to the integral of said attitude error signal;
    d. means for generating a signal proportional to the double integral of said attitude error signal; and
    e. means for generating said torque command signals as the sum of said signal proportional to said attitude error signal plus said signal proportional to said attitude rate error signal plus said signal proportional to said integral of said attitude error signal plus said signal proportional to said double integral of said attitude error signal.

10. The system according to claim 9 wherein said means for altering each of said torque command signals to said first and second wheels further includes:
   a. means for reversing the sign of said first and second command signals proportional to the double integral of said attitude error;
   b. means for adding to said sign reversed command signals a signal to compensate for gyroscopic cross-coupling between said first and second wheels.

11. The system according to claim 10 wherein said compensation signal for said first wheel is proportional to said angular velocity of said second wheel.

12. The system according to claim 10 wherein said compensation signal for said second wheel is proportional to said angular velocity of said first wheel.

13. The system according to claim 9 wherein said means for altering said torque command signal for said third wheel further includes:
   means for reversing the sign of said third command signal proportional to the double integral of said attitude error signal.

14. The system according to claim 1 wherein said third wheel is adapted to be rotated solely unidirectional and each of said first and second wheels are adapted for rotation direction reversals at times respectively different from the times of reversals of the other of said first and second wheels.

15. A method for controlling the attitude of a substantially zero momentum satellite having three mutually perpendicular axes and first, second, and third rotationally bi-directional reaction wheels each mounted on said satellite on a respective axis parallel with a respective one of each of said three mutually perpendicular axes, comprising the steps of:
   a. detecting deviations on each of said mutually perpendicular axes from a predetermined reference attitude;
   b. generating attitude error signals corresponding to said detected deviations;
   c. generating three torque command signals as a function of said attitude error signals, each of said torque command signals associated with a respective one of each of said three mutually perpendicular wheels, each of said torque command signals causing the associated one of said respective wheels to develop control torques and rotate at an angular velocity and direction of rotation to correct and reduce substantially to zero any deviations that are detected;
   d. comparing the speed of each of said three wheels to a threshold value of speed;
   e. generating in response to said comparing step for speeds equal to or less than said threshold value an anticipation signal manifesting an anticipated reversal of rotation of a given wheel; and
   f. altering each of said wheel torque command signals in response to said anticipation signal to increase the rate of reduction of said wheel rotation speed to zero and to increase the rate of increase of said wheel rotation speed after said wheel rotation is reversed, whereby deviations due to relatively low rotational speed and stoppage of said wheels are reduced substantially to zero.

16. The method of claim 15 wherein said threshold value of speed is in the order of 0.1 percent of the maximum speed of rotation of said wheels 17. The method of claim 15 wherein the step of generating each of said wheel torque command signals further includes the steps of:
   a. generating a signal proportional to said attitude error signal;
   b. generating a signal proportional to the rate of change of said attitude error signal;
   c. generating a signal porportional to the integral of said attitude error signal; and
   d. generating said torque command signal as the sum of said signal proportional to said attitude error signal, plus said signal proportional to said attitude rate error signal, plus said signal proportional to the integral of said attitude error signal.

18. The method of claim 17, wherein the step of altering each of said torque command signals for said first and said second wheels further includes the steps of:
   a. reversing the sign of said first and second command signals proportional to the integral of said attitude error signal;
   b. adding to said sign reversed command signals, a signal to compensate for gyroscopic cross-coupling between said first and second wheels.

19. The method of claim 17 wherein the step of altering said torque command signal for said third wheel further includes the step of:
   a. reversing the sign of said third command signal proportional to the integral of said attitude error signal.

20. The method of claim 15 wherein the step of generating each of said wheel torque command signals further includes the steps of:
   a. generating a signal proportional to said attitude error signal;
   b. generating a signal proportional to the rate of change of said attitude error signal;
   c. generating a signal proportional to the double integral of said attitude error signal; and
   d. generating said torque command signal as the sum of said signal proportional to said attitude error signal, plus said signal proportional to said attitude rate error signal, plus said signal proportional to said double integral of said attitude error signal.

21. The method of claim 20 wherein the step of altering each of said torque command signals for said first and second wheels further includes the steps of:
   a. reversing the sign of said first and second command signals proportional to the integral of said attitude error;
   b. adding to said sign reversed command signals, a signal to compensate for gyroscopic cross-coupling between said first and second wheels.

22. The method of claim 20, wherein the step of altering said torque command signal for said third wheel further includes the step of:
   a. reversing the sign of said third command signal proportional to the double integral of said attitude error signal.

* * * * *